March 31, 1936. M. STANTON 2,035,728
WATER SUPPLY AND DISTRIBUTION MEANS FOR A HUMIDIFIER
Filed July 13, 1934
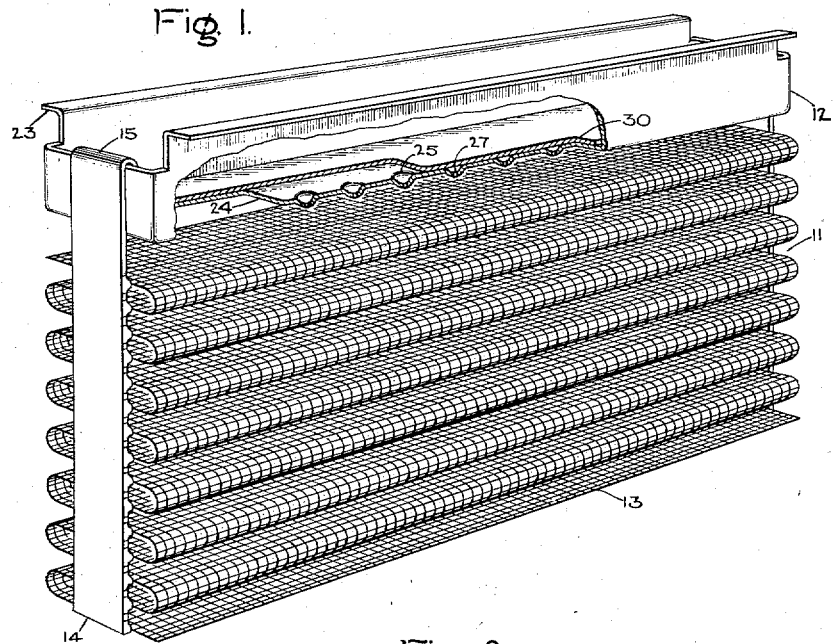
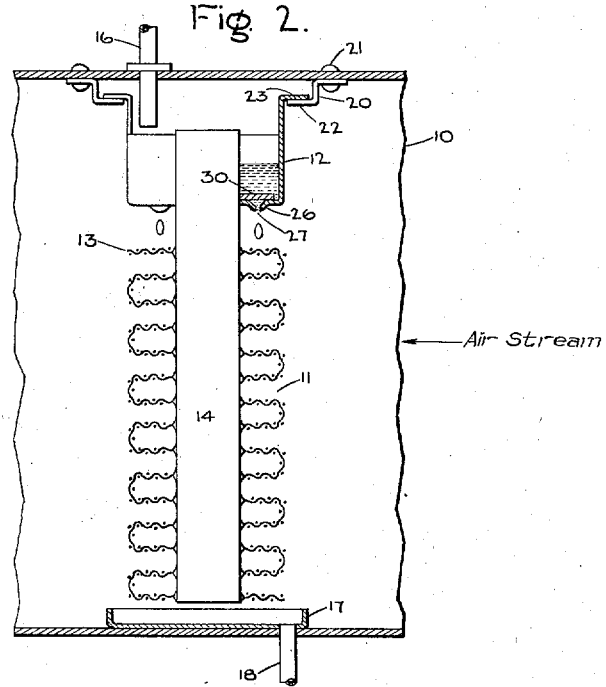
Inventor:
Myles Stanton,
by Harry E. Dunham
His Attorney.

Patented Mar. 31, 1936

2,035,728

UNITED STATES PATENT OFFICE 2,035,728

WATER SUPPLY AND DISTRIBUTION MEANS FOR A HUMIDIFIER

Myles Stanton, Schenectady, N. Y., assignor to General Electric Company, a corporation of New York Application July 13, 1934, Serial No. 734,975

5 Claims. (Cl. 299—58)

This invention relates to humidifiers and has for a principal object the provision of improvements in a humidifier of the type disclosed in the copending application of Clarence C. Bailey, Serial No. 733,077, filed June 29, 1934 assigned to the assignee of the present invention, whereby the operational care and frequency of attention required to maintain the efficient operation of the humidifier is materially reduced.

The disclosure of the Bailey application above identified includes a humidifier which in general may be said to consist of a screen-stack water-evaporating unit and a water storage and distributing pan located above the stack and having a plurality of openings in the bottom thereof for feeding an evenly distributed supply of water downwardly onto the top layer of the screen stack. In one embodiment of the Bailey disclosure, the bottom of the pan is provided with burrs or protuberances surrounding the openings to prevent the collection of water and the deposit of salt scale on the underneath surface of the pan.

In order to secure the proper control of the amount of water discharged from the pan, the discharge openings of the pan made in accordance with the teachings of the Bailey application are necessarily quite small. Restricting the size of the openings produces a backing up in the pan of the water supplied thereto until it attains a height sufficient to produce a gravitational head on the openings which will overcome the resistance thereof to flow. The backing up of the water results in an even distribution thereof over the bottom of the pan with the result that there is a substantially equal flow through the openings and a uniform distribution of the water over the top of the screen stack. If the openings are made large enough to permit free flow therethrough there is a tendency for all the water to flow through the openings nearest the source of supply resulting in nonuniform distribution over the top surface of the screen stack.

It has been found that if the openings in the bottom of a pan of the type above described are sufficiently small to properly control the amount of water discharged from the pan, deposits of foreign matter tend to collect on the inside of the pan around the openings with resulting eventual stoppage of the openings and the necessity for removal of the pan from the humidifier at more or less frequent intervals to clean the inside thereof. The stoppage may, to a large extent be prevented by increasing the size of the discharge openings, but if means are not provided for controlling the discharge from the larger openings, water will flow freely from the pan through a few of the openings without backing up to produce the desired uniform distribution. If water is supplied to the pan in an amount sufficient to cause it to collect evenly over the bottom surface, the resulting gravitational head will force an excessive amount of water from the pan onto the screen stack.

A specific object of the present invention is the provision of baffle means for a pan distributor of the type disclosed in the previously identified Bailey application, whereby larger discharge openings may be used and the flow of water through the large openings be restricted so that it will be uniformly distributed in the proper quantity.

In accordance with the present invention, depressions are formed in the bottom of the water distributing pan with the discharge openings located in the bottoms of the depressions, and a flat plate of sufficient area to cover all the depressions is placed in the bottom of the pan over the depressions so that water can only reach the openings by seepage around the edges of the plate and between the plate and the bottom surface of the pan.

A preferred embodiment of the present invention is illustrated in the accompanying drawing in which Fig. 1 is a perspective view of the improved water distributing pan and the screen-stack evaporating unit suspended therebeneath, and Fig. 2 is a side elevation showing the manner of mounting the humidifier unit in the humidifying zone of an air conditioning apparatus.

Referring to the drawing, 10 represents a portion of the casing of a humidifier shown in side elevation and cut away to illustrate the manner of mounting therein a screen-stack water-evaporating unit 11 and an improved water storage and distributing element 12 constructed in accordance with the present invention.

The water-evaporating unit 11 shown in the drawing is constructed in accordance with the disclosure of the copending application of Sydney E. Miller, S. N. 736,684, filed July 24, 1934, on which Letters Patent No. 2,006,928 were granted July 6, 1935 and which is assigned to the assignee of the present invention and sets forth an improvement in the construction of the evaporating unit disclosed in the previously identified Bailey application. This unit comprises in general a single strip of wire mesh screen 13 folded to provide a plurality of substantially horizontal superposed spaced apart layers of evaporating surface held in place by means of straps or end plates 14. On their upper ends the straps are provided with bent portions 15 for hooking them over the end rims of the pan 12 to support the evaporating unit dependingly below the pan.

A supply pipe 16 is inserted through the top wall of the casing 10 for supplying water, preferably heated, from any suitable source to the distributing pan 12, and a catch pan 17 having a drain pipe 18 is placed in the bottom of the casing beneath the evaporating unit for collecting and carrying away unevaporated water.

The distributing pan is supported in the top of the casing 10 by means of hangers 20 which are secured to the top wall of the casing by rivets 21, or other suitable means, and which hangers are provided with inwardly extending flanges 22 for engaging the outwardly projecting flanges 23 formed on the upper edges of the side rims of the pan 12.

The bottom portion 24 and preferably the whole of the pan 12 are constructed of thin sheet metal. Two parallel rows of spaced apart depressions 25, extending lengthwise of the pan, are formed in such manner that they will produce protuberances 26 depending beneath the bottom surface of the pan for purposes hereinafter to be pointed out. Holes 27 are punched through the bottoms of the depressions for discharging water from the pan downwardly upon the top layer of the screen stack 11, and these openings are preferably of such size that they will not be easily clogged up by deposits of scale or other foreign matter from the water, and that they will permit substantially free flow therethrough of the water which is supplied to the depressions 25. Though the discharge openings are herein illustrated as being arranged in two parallel rows, it is obvious that numerous other arrangements may be employed to give uniform distribution of water over the screen stack.

A plate 30 of slightly less area than that of the bottom of the pan but of sufficient area to cover all the depressions 25, is laid in the bottom of the pan to restrict the flow of water through the openings 27. This plate has a smooth bottom surface so that it rests evenly upon all portions of the bottom of the pan and in intimate contact therewith. By this means the flow of water from the pan to the openings is effectively restricted since the only water which can reach the depressions 25 and hence the openings, is that which seeps around the edges of the plate and between the contacting surfaces of the plate and the bottom of the pan. Due to the capillary action produced by the cooperation of these two surfaces the distribution of the water under the surface of the plate will be substantially uniform, which will result in an evenly distributed discharge of water from all the openings.

In the assembly of the humidifier the supporting straps 14 of the evaporating unit are first hooked over the end rims of the pan so that the evaporating unit depends beneath the openings 27 and then the humidifier is mounted in the casing 10 by sliding the pan in through the side of the casing with its flanges 23 resting upon the flanges 22 of the hangers 20. It will thus be seen that the unit is simple and lends itself to ready assembly and can easily be demounted for cleaning or replacing.

In operation, water is supplied to the pan 12 through the pipe 16 and the amount of water so supplied is properly adjusted in accordance with the discharge from the pan so that a proper height of water may be maintained in the pan. The water which is stored in the pan seeps around the edges of the plate and between the bottom surface of the plate and the surface of the pan into the depressions 25 from which it has a comparatively free flow downward through the relatively large openings 27 and onto the top layer of the screen stack 11. The water is there broken up into a multiplicity of particles which, if a screen of the type described in the previously referred to Bailey application is used and which is capable of collecting and suspending a multiplicity of globules of water at the intersections of the wires thereof, will delay the passage of the water downwardly and afford sufficient time for the air stream, which is forced through the casing by means of a fan or blower or any other suitable means, to effectively evaporate the water which is exposed on the surfaces of the screen. Any excess water will flow from the screen into pan 17 and thence through the drain 18 to a sewer (not shown).

It has been found that the employment of the present invention permits the use of discharge openings which are appreciably larger than those required in a pan-type water-distributing element constructed in accordance with the disclosure of the Bailey application, and hence that the frequency with which the unit requires removal for cleaning of the openings is greatly reduced. It has also been found that deposits will collect around the edges of the plate only at a very slow rate, or not at all, and that even if such deposits do collect, the efficient operation of the distributing pan is not appreciably impaired since the capillary action of the cooperating plate and pan surfaces causes the water to percolate evenly beneath the plate, even though a portion of the restricted space around the edge of the plate is stopped up. Thus, the operation and care of the humidifier is materially decreased and the efficiency of operation is materially increased.

It is obvious that the present invention is susceptible of modifications to meet particular circumstances and conditions and it is intended that such modifications as do not depart from the true spirit and scope of the invention shall be included within the scope of the appended claims in which are pointed out those features which are believed to be new and novel.

What I claim as new and desire to secure by Letters Patent of the United States, is:

1. A liquid distributing unit for an evaporating device comprising a container for storing a body of liquid and having openings in the bottom of the container for discharging liquid downwardly into the evaporating zone of said device, and means including a baffle positioned within said container having a gravity maintained contact with the bottom thereof providing complementary surfaces contacting with each other over an extended area for affording restrictive passages therebetween to conduct liquid by seepage from the main body of liquid to said openings.

2. A liquid distributing unit comprising a container for storing liquid provided with a bottom wall having a plurality of liquid discharge openings with a substantially smooth inner surface extending continuously around said openings and between adjacent ones of the openings, and means including a baffle member disposed in said container with a substantially smooth continuous surface contacting with the inner surface of said bottom wall over an area encompassing all of said openings and supported by said bottom providing restrictive passages between the bottom of said container and said baffle member for conducting liquid by seepage from the container to said openings.

3. A water distributing unit for a humidifier comprising a pan for storing a body of water and having a bottom wall provided with a substantially smooth inner surface and a plurality of openings for discharging water downwardly into the evaporating zone of the humidifier, and a flat plate disposed on and supported by the bottom wall of the pan having sufficient area to cover all said openings, said plate having a substantially smooth surface in substantially continuous engagement with the inner bottom surface of the pan for providing a restricted passage between said surfaces for conducting water by seepage from the main body of water to the openings.

4. In a humidifier, the combination of means for feeding water downwardly into the evaporating zone of the humidifier including a water storage pan disposed above said zone and having a plurality of depressions in the inner surface of the bottom of the pan with openings in the bottoms of the depressions for discharging water therefrom, and baffle means for checking the flow of water from the pan through the openings including a flat plate resting on and solely supported by the bottom of the pan and covering all of said depressions with a substantially smooth surface in substantially continuous contact with the inner surface of the bottom of the pan intermediate the rims of said depressions.

5. In a humidifier, the combination with means providing a surface for exposing water to be evaporated, of means for evenly distributing water over the top of said surface including a water storage pan disposed above said surface and having a plurality of depressions uniformly located over the inner bottom surface of the pan with discharge openings in the bottoms of the depressions, said depression providing protuberances surrounding said openings and depending from the bottom of the pan, and means for throttling the flow of water from the pan including a flat plate having a smooth surface disposed in and solely supported by the pan with said smooth surface contacting the inner surface of the bottom of the pan intermediate said depressions and covering all of said openings.

MYLES STANTON.

CERTIFICATE OF CORRECTION.

Patent No. 2,035,728. March 31, 1936.

MYLES STANTON.

It is hereby certified that error appears in the printed specification of the above numbered patent requiring correction as follows: Page 1, second column, line 15, for "large" read larger; page 3, second column, line 18, claim 5, for "depression" read depressions; and that the said Letters Patent should be read with these corrections therein that the same may conform to the record of the case in the Patent Office.

Signed and sealed this 12th day of May, A. D. 1936.

Leslie Frazer (Seal) Acting Commissioner of Patents.

surface contacting with the inner surface of said bottom wall over an area encompassing all of said openings and supported by said bottom providing restrictive passages between the bottom of said container and said baffle member for conducting liquid by seepage from the container to said openings.

3. A water distributing unit for a humidifier comprising a pan for storing a body of water and having a bottom wall provided with a substantially smooth inner surface and a plurality of openings for discharging water downwardly into the evaporating zone of the humidifier, and a flat plate disposed on and supported by the bottom wall of the pan having sufficient area to cover all said openings, said plate having a substantially smooth surface in substantially continuous engagement with the inner bottom surface of the pan for providing a restricted passage between said surfaces for conducting water by seepage from the main body of water to the openings.

4. In a humidifier, the combination of means for feeding water downwardly into the evaporating zone of the humidifier including a water storage pan disposed above said zone and having a plurality of depressions in the inner surface of the bottom of the pan with openings in the bottoms of the depressions for discharging water therefrom, and baffle means for checking the flow of water from the pan through the openings including a flat plate resting on and solely supported by the bottom of the pan and covering all of said depressions with a substantially smooth surface in substantially continuous contact with the inner surface of the bottom of the pan intermediate the rims of said depressions.

5. In a humidifier, the combination with means providing a surface for exposing water to be evaporated, of means for evenly distributing water over the top of said surface including a water storage pan disposed above said surface and having a plurality of depressions uniformly located over the inner bottom surface of the pan with discharge openings in the bottoms of the depressions, said depression providing protuberances surrounding said openings and depending from the bottom of the pan, and means for throttling the flow of water from the pan including a flat plate having a smooth surface disposed in and solely supported by the pan with said smooth surface contacting the inner surface of the bottom of the pan intermediate said depressions and covering all of said openings.

MYLES STANTON.

CERTIFICATE OF CORRECTION.

Patent No. 2,035,728. March 31, 1936.

MYLES STANTON.

It is hereby certified that error appears in the printed specification of the above numbered patent requiring correction as follows: Page 1, second column, line 15, for "large" read larger; page 3, second column, line 18, claim 5, for "depression" read depressions; and that the said Letters Patent should be read with these corrections therein that the same may conform to the record of the case in the Patent Office.

Signed and sealed this 12th day of May, A. D. 1936.

Leslie Frazer (Seal) Acting Commissioner of Patents.

CERTIFICATE OF CORRECTION.

Patent No. 2,035,728. March 31, 1936.

MYLES STANTON.

It is hereby certified that error appears in the printed specification of the above numbered patent requiring correction as follows: Page 1, second column, line 15, for "large" read larger; page 3, second column, line 18, claim 5, for "depression" read depressions; and that the said Letters Patent should be read with these corrections therein that the same may conform to the record of the case in the Patent Office.

Signed and sealed this 12th day of May, A. D. 1936.

Leslie Frazer (Seal) Acting Commissioner of Patents.